SOLID STATE SWITCHING DEVICE

Filed Sept. 27, 1965 2 Sheets-Sheet 1

INVENTOR
WILLIAM R. EUBANK
BY Carpenter, Kinney & Coulter
ATTORNEYS

INVENTOR.
WILLIAM R. EUBANK
BY
Carpenter, Kinney & Coulter
ATTORNEYS

April 4, 1967   W. R. EUBANK   3,312,923
SOLID STATE SWITCHING DEVICE
Filed Sept. 27, 1965   2 Sheets-Sheet 2

INVENTOR.
BY
ATTORNEYS

United States Patent Office 3,312,923

Patented Apr. 4, 1967

1

3,312,923

SOLID STATE SWITCHING DEVICE

William R. Eubank, Troy Township, St. Croix County, Wis., assignor to Minnesota Mining and Manufacturing Company, St. Paul, Minn., a corporation of Delaware Filed Sept. 27, 1965, Ser. No. 490,515
15 Claims. (Cl. 338—20)

This application is a continuation-in-part of my earlier filed application Ser. No. 376,484 filed June 19, 1964, now abandoned.

This invention relates to new and useful glass compositions containing antimony, sulfur and iodine.

More specifically, in one embodiment this invention is directed to ternary glasses comprising antimony, sulfur and iodine, the respective quantities of each such element needed to compose a particular glass composition being variable over predetermined ranges. This embodiment is also directed to a class of glasses containing antimony, sulfur and iodine within the aforementioned class of ternary glasses but containing a portion of the antimony substituted by one or more of certain other elements from Groups IIIB, IVB, and VB of the Periodic Table and further optionally containing a portion of the sulfur replaced by one or more of certain other elements selected from Group VIB of the Periodic Table. This invention is further directed to methods for making such glasses.

In another embodiment this invention is directed to novel semiconductor devices which use the above-indicated glasses. This embodiment is also directed to methods for making such devices and to methods for making such devices and to methods for using such devices. This embodiment is further directed to circuitry for using such devices.

In still another embodiment this invention is directed to glass compositions having use in retroreflective structures. This embodiment is also directed to glass structures formed from such glass compositions.

In still another embodiment this invention is directed to opaque high resistivity glasses which, when molten, possess high fluidity and ability to wet ceramic materials.

In the following description, references are made to the accompanying drawings wherein.

Figure 1:
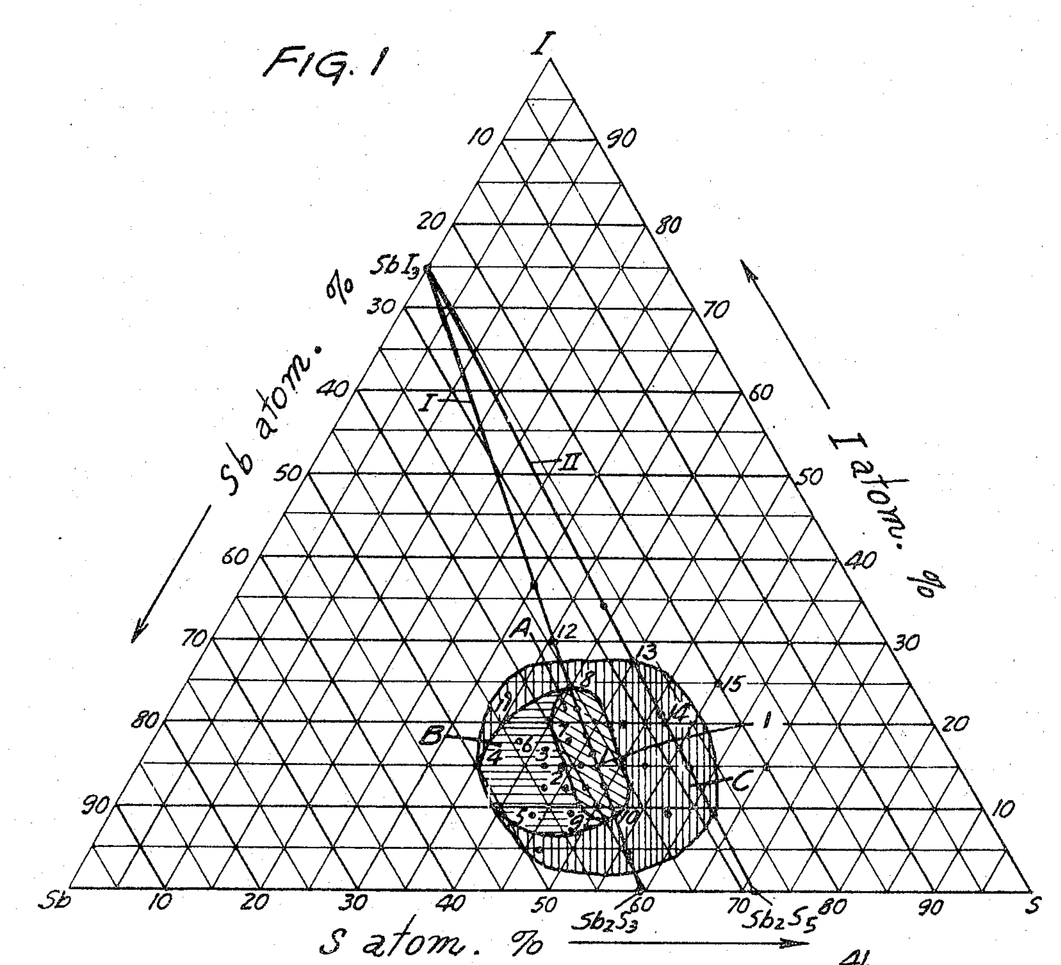
FIGURE 1 is a ternary diagram of the system antimony-sulfur-iodine showing the glass compositions in atomic weight percentages.

In general, the starting materials employed to produce glasses of this invention either are the uncombined elements or are compounds of two or more such elements. When using uncombined elements, it is generally preferable to employ each in a highly purified and finely divided form. However, largely because of the high volatility of elemental iodine, it is convenient and preferred to employ compounds of iodine in place of iodine itself; for example $SbI_3$.

2

Finely divided flowers of sulfur are found to be a convenient form of that element to use for making compositions. Granular or powdered analytical grade antimony is preferably employed. The sulfur and antimony can be preferably prereacted in the ratio to form $Sb_2S_3$ before addition of the ternary component and subsequent formation of a glass, as described below.

In general, one can conveniently use two methods to prepare glass compositions of this invention. One method involves melting starting materials in a closed tube, and the other involves melting starting materials, or remelting a glass formed in the closed tube, in an open tube in order to deposit thin glass layers on a substrate.

The closed tube method for preparing glasses of this invention involves melting the starting materials within a suitable heat resistant sealed tube, as indicated.

The tube after sealing is then preferably suitably mounted for axial rotational movements in a hot zone maintained at a temperature of about 800° C. or higher. Each sealed tube is appropriately thus maintained in such hot zone for about ½ to 1 hour or until a homogenous liquid melt is obtained. Thereafter, the tube and melt therein are removed from the hot zone and allowed to cool slowly. If any crystallization is visually observed, the tube and contents are remelted and then rapidly cooled.

When melting in an open tube, one can employ heat resistant glass tubes and deposit in each tube a measured premixed quantity of individually weighed desired starting materials. Each such tube is then immersed into a hot zone maintained at a temperature of from about 600° C. to 700° C. with temperatures about 650° C. being preferred. Though times for the starting materials to melt and become homogeneous vary, they commonly range from about ½ to 1 hour, though longer or shorter times may be experienced depending on individual circumstances. Stirring helps promote homogeneity. After a homogeneous melt is obtained, the tube is removed from the hot zone and allowed to cool in air at room temperature. This cooling rate is generally slower than about 10° centigrade per second (10° C./sec.).

If one visually observes any crystallization in the melt as it thus slowly cools within the tube, such tube can be reinserted into the hot zone and the mixture remelted. Then when the hot tube and contents are removed from the hot zone, they are rapidly quenched, as by immersion into water at room temperature or the like, so as to rapidly cool such tube and contents at a rate greater than about 100° centigrade per second (100° C./sec.).

The closed tube method is preferred for studying the glass-forming characteristics of the system studied since possible volatilization losses, resulting in slight compositional changes during melting are thereby eliminated. Also, higher temperatures, by about 100° C., may be employed allowing solution of certain more difficulty soluble components to take place more readily. For practical purposes such as application of thin layers of the glass on a substrate, however, it was necessary to employ the open tube method of melting. In many cases glasses made and characterized by the closed tube method were remelted and obtained as thin layers by the open tube method.

For purposes of this invention in determining whether or not a cooled solid product is a glass (e.g. for establishing the glass compositions of FIGURE 1), the following considerations are used:

(1) Presence of conchoidal fracture upon breaking of a sample.

(2) Substantially no birefringence (i.e. double refraction) when a sample is examined under a petrographic microscope (with a glass which is not too opaque for such an examination).

(3) Substantially no distinct lines indicative of crystal structure when a sample is examined by conventional X-ray powder diffraction techniques.

(4) Gradual softening and final remelting of a sample as its temperature is increased (in contrast to the sharp melting points characteristically observed in the case of crystallized materials).

(5) Forming a long continuous [e.g. 2.5 feet (about ¾ meter) or longer] fiber from a sample of molten material as by pulling or suddenly extending in air a sample of molten material smaller than about ½ gram before such sample solidifies.

By the use of the foregoing methods and considerations, the phase diagram of FIGURE 1 is prepared. The examples given in Tables I and II below illustrate typical glass compositions which are plotted in terms of atomic percentages of the constituents present and which illustrate the definition of this phase diagram.

Referring to Table I, nine examples of glass formation within the ternary system of FIGURE 1 are given together with details of composition, electrical and switching properties for each.

Table I illustrates glass compositions within the glass forming region defined by areas A and B of the ternary system shown in FIGURE 1. For instance, Example 1 illustrates a glass derived from a composition consisting of 80 mole percent antimony trisulfide and 20 mole percent antimony triiodide (37 atomic percent Sb), while the glass of Example 4 of Table I contains 50 atomic percent antimony (i.e. 13 atomic percent greater than that in the glass of Example 1).

Electrical properties of each glass example are also illustrated in Table I. In general, 0.025 mm. (millimeter) layers of glasses of this invention have initial resistances ranging from about $10^{12}$ to $10^{15}$ ohms./mm. However, for purposes of clarity in presentation, more detailed explanation of electrical properties is given below.

Table II illustrates glass compositions near the boundary of the glass forming region designated area C of FIGURE 1. For example, the glass of Example 11 in Table II is just inside the glass forming region outlined in the ternary diagram of FIGURE 1. This glass forms a dark red shiny glass when slowly cooled. On the other hand, the glass of Example 12 of Table II completely devitrifies upon slow cooling showing both birefringence and strong X-ray powder diffraction lines. Such composition could not be quenched to a stable glass. Hence, it falls outside of the glass forming region encompassed by this invention (i.e., regions A, B and C of FIGURE 1). Note also that this composition has poor electrical properties.

Specifically, the glass compositions of the examples in Table I were prepared by using both the closed tube and the open tube methods above described. The closed tube technique was used to evaluate the glass forming characteristics of each composition, then each composition is thereafter remelted in an open tube and thin layers deposited on an aluminum strip by dipping. In each example, the procedure followed was to deposit from about 25 to 50 grams of carefully premixed starting materials in the bottom of a refractory glass test tube. Each tube was then evacuated as with a mechanical rotary vacuum pump to a pressure less than about 10 torr (one torr is equivalent to a pressure of 1 millimeter of mercury, $\frac{1}{760}$ atmosphere). Thereafter, each tube was sealed with an oxygen-gas torch, and deposited in an iron pipe adapted to be axially rotated in a tube furnace. Such pipe is then mounted in the tube furnace. Each sample is then maintained in the furnace at a temperature of about 800° C. for about ¾ of an hour, after which the pipe is removed from the furnace and slow cooled. As described above, in the event crystals are formed, the tube is reheated to remelt the contents and then the tube and contents are quenched by immersion into room temperature water (about 20° C.). After breaking of the glass tube and separating the sample, the sample is deposited in an open tube and remelted at a temperature somewhat above 600° C. and an aluminum strip immersed into the melt so as to provide a layer approximately 1 mil (about 0.025 mm.) thick on the aluminum. Conveniently such aluminum strip has one surface previously carefully cleaned and is 16 mils (about 0.4 mm.) in thickness and ½ inch (about 1.27 cm.) wide and 6 to 8 inches (about 15–20 cm.) long. If the molten glass on the aluminum strip devitrified on cooling, the sample was considered inoperative for purpose of this invention. After dipping and cooling, each so-coated strip is inserted into a sand blasting unit, such as an S. S. White dental abrader, and a glass layer on one side of the aluminum strip completely removed so that subsequent electrical contact can be made with the so-cleaned aluminum surface. Thereafter, the electrical measurements shown were made on the thin layers of glass, as further described hereinafter, when electrical properties of devices of this invention are described.

The glasses of Table II were similarly prepared by the closed tube method and remelted by the open tube method. The preparation procedure followed in each case was substantially the same as that used in the case of the examples of Table I. Finally, the indicated physical measurements were made on each glass sample coating.

In establishing the ternary diagram for the glass system of this invention it is found to be convenient as a matter of preparatory technique to form glass compositions along either of two joins in the system which are labeled in FIGURE 1 as I and II, respectively. These joins are chosen so as to connect two different compounds, namely antimony triiodide and antimony tri-sulfide respectively, in the case of join I, and, antimony triiodide and antimony pentasulfide respectively, in the case of join II.

TABLE I (METRIC SYSTEM).—TERNARY, SINGLE PHASE GLASSES OF THE SYSTEM Sb–S–I

| Example No. | Composition Atomic Percent | | | Resistance of 0.025 mm. Glass Layer (ohms per mm.) | | | Field (volts per mm.) Required For— | | |
|---|---|---|---|---|---|---|---|---|---|
| | Sb | S | I | Initial | High | Low | Induced Conduction | Down-switch [1] | Upswitch [2] |
| 1 | 37 | 48 | 15 | $2\times10^{14}$ | $1.2\times10^{14}$ | $8\times10^{3}$ | $8\times10^{4}$ | $1.2\times10^{4}$ | $3.2\times10^{2}$ |
| | (80 Mole Percent $Sb_2S_3$, 20 Mole Percent $SbI_3$) | | | | | | | | |
| 2 | 41 | 44 | 15 | $2\times10^{13}$ | $2\times10^{12}$ | $1.2\times10^{4}$ | $4\times10^{4}$ | $8\times10^{3}$ | $1.2\times10^{2}$ |
| 3 | 43 | 42 | 15 | $1.2\times10^{13}$ | $1.6\times10^{12}$ | $1.2\times10^{4}$ | $4\times10^{4}$ | $8\times10^{3}$ | $1.2\times10^{2}$ |
| 4 | 50 | 35 | 15 | $3.2\times10^{12}$ | $4\times10^{11}$ | $2.8\times10^{4}$ | $2.8\times10^{4}$ | $7.6\times10^{3}$ | $1.2\times10^{2}$ |
| 5 | 47 | 43.5 | 9.5 | $1.6\times10^{12}$ | $3.2\times10^{11}$ | $2\times10^{4}$ | $2.2\times10^{4}$ | $7.6\times10^{3}$ | $1.2\times10^{2}$ |
| 6 | 44 | 38 | 18 | $4\times10^{13}$ | $2\times10^{13}$ | $2\times10^{4}$ | $5.7\times10^{4}$ | $1.2\times10^{4}$ | $3.2\times10^{2}$ |
| 7 | 40 | 40 | 20 | $3.2\times10^{14}$ | $8\times10^{13}$ | $8\times10^{3}$ | $6.2\times10^{4}$ | $1.4\times10^{4}$ | $2.4\times10^{2}$ |
| 8 | 35 | 40 | 25 | $6\times10^{14}$ | $1.2\times10^{14}$ | $3.2\times10^{4}$ | $7.2\times10^{4}$ | $1.6\times10^{4}$ | $2\times10^{2}$ |
| | (67 Mole Percent $Sb_2S_3$, 33 Mole Percent $SbI_3$) | | | | | | | | |
| 9 | 43 | 47.5 | 9.5 | $3.3\times10^{12}$ | $4\times10^{12}$ | $1.6\times10^{4}$ | $3.2\times10^{4}$ | $8\times10^{3}$ | $2\times10^{2}$ |

[1] "Downswitch" has reference to the change which occurs in a glass when it switches from its high resistance state to its low resistance state in response to an applied electric field.

[2] "Upswitch" has reference to the change which occurs in a glass when it switches from its low resistance state to its high resistance state in response to an applied electric field.

TABLE I (ENGLISH SYSTEM).—TERNARY, SINGLE PHASE GLASSES OF THE SYSTEM Sb-S-I

| Example No. | Composition Atomic Percent | | | Resistance, 1 mil Glass Layer, ohms | | | Field (volts per mil) Required For— | | |
|---|---|---|---|---|---|---|---|---|---|
| | Sb | S | I | Initial | High | Low | Induced Conduction | Down-switch [1] | Up-switch [2] |
| 1 | 37 | 48 | 15 | $5\times10^{12}$ | $3\times10^{11}$ | 200 | 2,000 | 300 | 8 |
| | (80 Mole Percent $Sb_2S_3$, 20 Mole Percent $SbI_3$) | | | | | | | | |
| 2 | 41 | 44 | 15 | $5\times10^{11}$ | $5\times10^{10}$ | 300 | 1,000 | 200 | 3 |
| 3 | 43 | 42 | 15 | $3\times10^{11}$ | $4\times10^{10}$ | 300 | 1,000 | 200 | 3 |
| 4 | 50 | 35 | 15 | $8\times10^{10}$ | $1\times10^{10}$ | 700 | 700 | 190 | 3 |
| 5 | 47 | 43.5 | 9.5 | $4\times10^{10}$ | $8\times10^{9}$ | 500 | 540 | 190 | 3 |
| 6 | 44 | 38 | 18 | $1\times10^{12}$ | $5\times10^{11}$ | 500 | 1,380 | 300 | 8 |
| 7 | 40 | 40 | 20 | $8\times10^{12}$ | $2\times10^{12}$ | 200 | 1,550 | 350 | 6 |
| 8 | 35 | 40 | 25 | $1.5\times10^{13}$ | $3\times10^{12}$ | 800 | 1,800 | 400 | 5 |
| | (67 Mole Percent $Sb_2S_3$, 33 Mole Percent $SbI_3$) | | | | | | | | |
| 9 | 43 | 47.5 | 9.5 | $8.2\times10^{11}$ | $1\times10^{11}$ | 400 | 800 | 200 | 5 |

[1] "Downswitch" has reference to the change which occurs in a glass when it switches from its high resistance state to its low resistance state in response to an applied electric field.
[2] "Upswitch" has reference to the change which occurs in a glass when it switches from its low resistance state to its high resistance state in response to an applied electric field.

TABLE II.—TYPICAL TESTS FOR VITREOUS PROPERTIES OF SOME COMPOSITIONS NEAR BOUNDARIES OF GLASS FORMING REGION

| Example No. | For 50 gram Melts | | | | For thin Films [1] | |
|---|---|---|---|---|---|---|
| | Cooling Rate of Melt | Visual Appearance | Microscopic [2] Examination | X-ray Powder Diffraction | State of Material | Electrical Properties |
| 10 | Slow [3] | Dark red, shiny glass | Traces birefringence | No lines | Glassy | Good. |
| | Quenched [4] | Fritted glass [6] | No birefringence | do | | |
| 11 | Slow | Dark glass | Birefringence | Lines | Glassy | Do. |
| | Quenched | Fritted glass | No birefringence | No lines | | |
| 12 | Slow | Dull brown mass | Birefringence | Strong lines | Devitrified | Poor.[5] |
| | Quenched | Crystalline powder | do | do | | |
| 13 | Slow | Dull brown mass | do | Lines | Devitrified | Do. |
| | Quenched | Fritted glass | Traces birefringence | Faint lines | | |
| 14 | Slow | Dull brown mass | Birefringence | Lines | Glassy | Good. |
| | Quenched | Fritted glass | No birefringence | No lines | | |
| 15 | Slow | Dull brown mass | Birefringence | Strong lines | Devitrified | Poor. |
| | Quenched | Crystalline powder | do | do | | |

[1] Each film made by dipping a cold aluminum strip into molten glass and rapidly withdrawing; average film thickness was about 1 mil or less.
[2] Employing a petrographic microscope (crossed Nicol prisms) with polarized light, tests are made for birefringence (double refraction).
[3] Cooling rate of less than 10° C./sec.
[4] Cooling rate of greater than 100° C./sec.
[5] Inoperative for this invention.
[6] The term "fritted" has reference to a vitreous granular material.

Surprisingly very stable glasses are found at along join I between about 70 and 90 mole percent $Sb_2S_3$. For example, the composition comprising 80 mole percent antimony tri-sulfide and 20 mole percent antimony tri-iodide gives a completely vitreous, homogenous stable glass which corresponds approximately to composition No. 1, FIGURE 1. Observe that in FIGURE 1, Table I and Table III, respective percentages of antimony, sulfur and iodine are given on an atomic basis. In many compositional studies of the glasses of this invention, this composition No. 1 served as a basis for substitution on a partial atomic basis both for the antimony and for the sulphur in the glass system.

Referring to FIGURE 1, there is seen a circular area of glass formation within the ternary system Sb–S–I with a center at point 1, FIG. 1. Point one designates a glass made using approximately 80 mole % $Sb_2S_3$, 20 mole % of $SbI_3$. The radius of this circular area of glass formation is about 13 to 14 atomic percent. The composition of the center point on an atomic basis is 37 at percent Sb, 48 at percent S and 15 atomic percent I. The range of compositions within the circular glass forming area is approximately as follows:

24 to 50 atomic percent Sb±13% of point 1, FIG. 1
34 to 62 atomic percent S±14% of point 1, FIG. 1
2 to 28 atomic percent I±13% of point 1, FIG. 1

Within this circular area of FIG. 1 comprising the separately designated parts A, B and C of glass formation, three different types of glasses were found.

In ternary glass compositions of this invention, the antimony and sulfur surprisingly can be partially replaced or substituted by various other elements from the Periodic Table without upsetting the glass forming capabilities of this ternary system. The procedure in making such substitutions generally involves replacing a predetermined quantity of either or both the antimony and the sulfur in the mixture of starting materials by suitable precursors which will introduce into the fused or melted product glasses a desired percentage of substitution.

The characteristics of the basic ternary glass are thereby altered in a wide variety of ways by the substitutions given in Table III (below). For example, a given number of atoms up to a given maximum atomic percent of the antimony can be substituted by other elements, for example 8 atomic percent of phosphorus, Example 16, Table III and so on. Also, it is found that, other chalcogens, such as selenium and tellurium can be substituted for the sulfur on a partial atomic basis. For example, 12 atomic percent of sulfur is substituted by 12 atomic percent of selenium, Example 19, Table III. Resistance data for one mil (about 0.025 mm.) thick glass layers in both the initial, high and low resistance states for each glass are also given together with the respective fields in volts per mil (or mm., as the case may be) required for upswitch and for downswitch. In general, the respective maximum substitutions both for antimony and for sulfur that can be made are given on the basis of the maximum amount that can be employed and still retain glass forming characteristics of the composition. Thus, in the case of germanium, Example 23, Table III, a range of compositions up to 20 atomic percent germanium were found to form stable glasses. Beyond 20 atomic percent germanium, glasses were not homogeneous, i.e., contained a second phase or showed devitrification, and so are considered outside the scope of this invention.

The glass compositions in Table III are prepared and tested in the same manner as previously described for those glasses shown in Tables I and II with the exception that the additional components were initially added to the basic ternary glass compositions in partial substitution for antimony and/or sulfur, in each instance as specifically designated in Table III.

TABLE III (ENGLISH SYSTEM).—SUBSTITUTED GLASSES

| Example No. | Composition of Substituted Glass (Atomic Percent) | | | | | Electrical and Switching Properties | | | | | |
|---|---|---|---|---|---|---|---|---|---|---|---|
| | | | | | | Resistance, 1 mil Glass Layer (ohms) | | | Field (volts per mil) Required For— | | |
| | At Percent Sb | At Percent S | At Percent I (const.) | At Percent (other metal) | At Percent Other Chalcogen | Initial | High | Low | Induced Conduction | Up-switch [1] | Down-switch [2] |
| 16 | 29 | 48 | 15 | 8 P | | $3\times10^8$ | $6\times10^7$ | 130 | 800 | 2.8 | 30 |
| 17 | 15 | 48 | 15 | 22 As | | $2\times10^{12}$ | $8\times10^{11}$ | 500 | 3,000 | 10 | 500 |
| 18 | 21 | 24 | 15 | 16 As | 24 Se | $5\times10^{10}$ | $1\times10^8$ | 400 | 4,200 | 2 | 400 |
| 19 | 37 | 36 | 15 | | 12 Se | $7\times10^{11}$ | $2\times10^{10}$ | 800 | 1,000 | 6.8 | 50 |
| 20 | 37 | 36 | 15 | | 12 Te | $3\times10^9$ | $8\times10^8$ | 500 | 250 | 1 | 25 |
| 21 | 35 | 48 | 15 | 2 Bi | | $2\times10^{11}$ | $7\times10^{10}$ | 1,000 | 500 | 2.5 | 50 |
| 22 | 29 | 46 | 15 | 10 Si | | $4\times10^9$ | $5.2\times10^8$ | 1,500 | 1,600 | 1.2 | 100 |
| 23 | 21 | 44 | 15 | 20 Ge | | $8.1\times10^6$ | $1\times10^6$ | 170 | 850 | 1.8 | 230 |
| 24 | 25 | 45 | 15 | 15 Sn | | $3.5\times10^8$ | $5.6\times10^7$ | 250 | 700 | 3 | 350 |
| 25 | 29 | 46 | 15 | 10 Pb | | $6\times10^9$ | $5\times10^7$ | 300 | 900 | 3 | 400 |
| 26 | 29 | 42.7 | 15 | 13.3 In | | $1\times10^5$ | $3\times10^4$ | 200 | 26 | 0.8 | 8 |

[1] "Upswitch" has reference to the change which occurs in a glass when it switches from its low resistance state to its high resistance state in response to an applied electric field.

[2] "Downswitch" has reference to the change which occurs in a glass when it switches from its high resistance state to its low resistance state in response to an applied electric field.

Since preparatory procedures, glass determination, and phase diagram delineation are all matters within the skill of those having ordinary familiarity with the art, a further detailed explanation thereof would burden this specification unnecessarily.

The glass product compositions of this invention comprise a ternary glass system and certain substituted glasses based thereon. The ternary glass composition in its broadest aspect comprises antimony, sulfur and iodine in respective amounts as defined by the shaded areas A, B and C of FIGURE 1 in the drawing.

Shaded area A defines ternary glass compositions capable of being formed into a homogeneous solid phase by cooling a liquid composition from a temperature above 600° C. to room temperature at a rate slower than about 10° centigrade per second (10° C./sec.). Integrally imbedded in the cooled solid compositions of area A compositions one can observe no discrete deposits of free antimony metal greater than about 1 micron (about $10^{-3}$ mm.) in average individual maximum cross-sectional dimension.

The ternary glass composition defined by shaded area B of FIGURE 1 of the drawing is capable of being formed into a homogeneous phase in the same manner as the ternary glass composition defined by shaded area A, that is, by cooling a liquid composition from a temperature above 600° C. to room temperature at a rate slower than about 10° centigrade per second (10° C./sec.). However, compositions defined by area B have integrally imbedded therein, when slow cooled to a solid state, discrete deposits of free antimony metal each of which has an individual average maximum cross-sectional dimension greater than about 1 micron.

When a glass in shaded area B of the glass forming region of FIGURE 1 is cooled from a molten state, free antimony metal can appear apparently by an exsolution of that metal from the glass. Once molten metal segregates from the molten glass it settles to the bottom of the melting container, commonly, as a globule of free metal because the molten metal has considerably higher density than that of the molten glass. This globule is readily separated from the glass after cooling. In general, there is no distribution of antimony particles in a solid glass matrix in average maximum cross-sectional dimension greater than about 1 micron, except in the separate globule.

The presence of discrete deposits of free antimony metal each having an average individual maximum cross-sectional dimension greater than about 1 micron in glass compositions of this invention for purposes of this invention can be detected by optical methods. For example, by conventional microscopic techniques involving examining a glass section, one can detect the presence or absence of antimony metal deposits down to about 1 micron in average maximum cross-sectional dimension.

When using the closed tube method, the compositions plotted in area A, FIGURE 1, are substantially the same as the starting compositions as weighed on an analytical balance or other suitable weighing device. Although those glasses in area B can contain some free metal as explained above, this free metal is, however, distinct and separate from the glassy phase. Although the presence of metal necessarily means that the location of glass compositions in area B, FIGURE 1, is less exact, nevertheless the glass compositions of this invention as defined by the respective areas A, B and C are considered to be substantially single phased.

The ternary glass composition defined by shaded area C of FIGURE 1 of the drawing, unlike those glass compositions defined by shaded areas A and B, is capable of being formed into a glassy solid state by cooling a liquid composition from a temperature above 600° C. to room temperature by cooling the liquid composition at a rate faster than about 100° C. per second (100° C./sec.). If a rate much slower than this is used non-vitreous products result. Integrally imbedded within the solid glass ternary compositions defined by shaded area C are substantially no discrete deposits of free antimony metal greater than about 1 micron in average individual maximum cross-sectional dimension.

One of the unusual features of the ternary glass compositions defined by shaded area A of FIGURE 1 is that either or both the antimony and the sulfur can be partially replaced by other elements. Thus, in a given glass composition of this invention the atomic percent of antimony present can be partially replaced by at least one and less than 4 (preferably only one) of the elements indicated in the following Table IV up to about the maximum atomic percent (Max. At. percent) indicated in said Table IV for each such respective element, provided there is at least 15 atomic percent of antimony remaining in such composition.

TABLE IV

| Periodic Table Grouping | | | | | |
|---|---|---|---|---|---|
| Group IIIB | | Group IVB | | Group VB | |
| Element | Max. At. Percent | Element | Max. At. Percent | Element | Max. At. Percent |
| In | 15 | Si | 10 | P | 8 |
| | | Ge | 20 | As | 24 |
| | | Sn | 15 | Bi | 2 |
| | | Pb | 10 | | |

Similarly, the atomic percent of sulfur present in ternary glass compositions defined by shaded area A can have the sulfur present partially replaced by an element from Group VIB of the Periodic Table as more specifically in- Group VIB of the periodic table as more specifically indicated in the following Table V, the maximum atomic percent (Max. At. percent) which can be substituted for sulfur being indicated for each such respective element. In addition, it was found that when arsenic substitutes partially for the antimony, as much as 24 atomic percent selenium can simultaneously substitute partially for the sulfur to form a stable, homogeneous glass, Example 18, Table III.

TABLE V

| Element | Max. At. Percent |
|---|---|
| Se (alone) | 12 |
| Se (As present) | 24 |
| Te (alone) | 12 |

The minimum amount of antimony in any given composition is not less than about 15 atomic percent and the minimum amount of sulfur in any given compostion is not less than about 24 atomic percent.

In general, all of the glass compositions in this invention as above described are useful in the manufacture of semiconductor switching devices. A semiconductive solid state switching device of this invention is capable of downswitching from a characteristic high resistance state to a characteristic low resistance state in response to an electric field pulse, and further is capable of upswitching from said low resistance state to said high resistance state in response to another appropriate electric field pulse. The downswitch pulse required for switching is larger than the upswitch pulse required for switching and the high resistance state is at least about one order in magnitude greater than the low resistance state.

A switching device of this invention utilizes a wafer of a glass of this invention, either one having a composition as described by the shaded areas A, B, and C of FIGURE 1, or one having a composition in which the antimony and/or the sulfur is partilly replaced by one or more of the respective elements indicated in Tables IV and V above. Such a wafer can have any convenient form. One preferred form is to deposit in a thin layer of glass composition uniformly upon a metal substrate, especially aluminum. Another method is to lap down (e.g. grind or abrade) a solid mass of glass composition to a desired thinness, though this method is limited by the thinness of the layer which can be readily produced and handled.

Conveniently and in general, such wafer is in the form of a thin film envelope having a front face and a back face. Each such respective face is commonly separated from the other by an average glass thickness of from about 0.5 to 18 mils (about 0.012 to 0.45 mm.), such thickness depending upon the characteristics, shape, etc., desired in a given device. The cross-sectional area of each such face is substantially greater than the glass thickness. Other forms of wafer constructions can also be employed, as those skilled in the art will readily appreciate.

Two electrodes are functionally associated with the wafer, each one with a different surface region thereof. In the case of thin layers, it is convenient to position one electrode on one face of the glass wafer and the other on the opposite face although any suitable arrangement can be used including adjacent positioning of electrodes on a common face. The electrodes can be functionally associated with a wafer in any given way as by employing spring-loaded pointed metal, such as tungsten, contacts. In other cases the electrode on the glass surface may be formed from air drying silver paste. If desired, suitable lead wires of a conductor such as copper or aluminum may be soldered to the silver spot employing Woods metal (e.g. 50 wt. percent bismuth, 25 wt. percent lead, 12.5 wt. percent tin, and 12.5 wt. percent cadmium), or other low melting solder.

When the wafer is deposited upon a thin metal substrate or other conductive substrate, such substrate then forms one electrode. Of course, suitable leads are connected to the electrodes to connect the resulting switching device into a circuit. It will be appreciated that more than two electrodes can be secured to a single wafer construction. The relationship between a wafer and each pair of electrodes functionally associated therewith is such that the wafer has a characteristic initial resistance state measured through such electrodes greater than the characteristic high resistance state. The relationship is also such that when a sufficient minimum electric field is applied to such a device (e.g. wafer plus electrode pair spaced as described) such device becomes semiconductive as indicated by a change or drop from the characteristic high initial resistance state to a characteristic low resistance state. For example, when a 50 kiloohm resistance is connected in series with such wafer, such resistance serves to limit current passing therethrough.

The initial high resistance state, the high resistance state, and the low resistance state, are usually quite constant for a given device. Such resistance states, for purposes of this invention, are conveniently measured in terms of ohms per mil (or ohms per millimeter) of shortest distance between a pair of electrodes used for making such measurements. Thus, the initial resistance characteristically falls in the range of from about $10^5$ to $10^{13}$ ohms per mil (or about $4\times10^6$ to $4\times10^{14}$ ohms per mm.) of shortest distance between electrodes, the high resistance is in the range of from about $10^4$ to $10^{12}$ ohms per mil (or about $4\times10^5$ to $4\times10^{13}$ ohms per mm.) of shortest distance between electrodes and the low resistance is in the range of from about $10^2$ to $10^3$ ohms per mil (or about $4\times10^4$ ohms per mm.) of shortest distance between electrodes.

When a switch device is first prepared, it is essentially nonconductive (e.g. it has a characteristic initial high resistance); however, as indicated above, it becomes semiconductive (e.g. falls to a characteristic low resistance state) when a sufficient minimum electric field is applied to the wafer plus, for example, a 50 kiloohm series resistor through a pair of electrodes whose space is usually, though not necessarily, in the range of from about 0.5 to 18 mils (or about 0.012 to 0.45 mm.). To render such device semiconductive, electric fields in the range of from about 10 to $10^3$ volts per mil (or about 400 to $4\times10^4$ volts per mm.) are commonly used although it will be appreciated that values greater or lower than this can be employed depending upon individual circumstances. This minimum field can be in the form of short bursts or pulses of electric potential. As soon as a device becomes semiconductive, such change can be detected readily by a drop from the characteristic initial resistance state to a lower resistance state which is the characteristic low resistance state for that device.

Once such device is in its characteristic low resistance state the 50 kiloohm series resistor is removed, and when an appropriate upswitch electric field pulse is applied to said device, it switches to its high resistance state. Usually upswitch electric field pulses fall in the range of from about 0.8 to 10 volts per mil (or about 32 to 400 volts per mm.) though potential values above and below this range can be employed depending upon individual circumstances. The minimum pulse duration in terms of time necessary to obtain upswitching similarly varies but commonly appears to be of the order of a few microseconds or less.

One such a device is switched from its low resistance state it assumes its characteristic high resistance state as indicated, but then becomes susceptible to downswitching or returning to its characteristic low resistance state when, for example, a 50 kiloohm resistor is in series and a suitable electric pulse applied. For downswitching, suitable electric field pulses range from about 8 to 500 volts per mil (or about 320 to $2\times10^4$ volts per mm.) of time duration from about 1 microsecond to 1 millisecond, though values greater or smaller than this, of course, may be necessary in individual circumstances.

Usually, there does not appear to be any determinable limit upon the number of times a device may switch from its high resistance state to its low resistance state. Observe that the high resistance state is always lower than the initial high resistance state.

Figure 2:
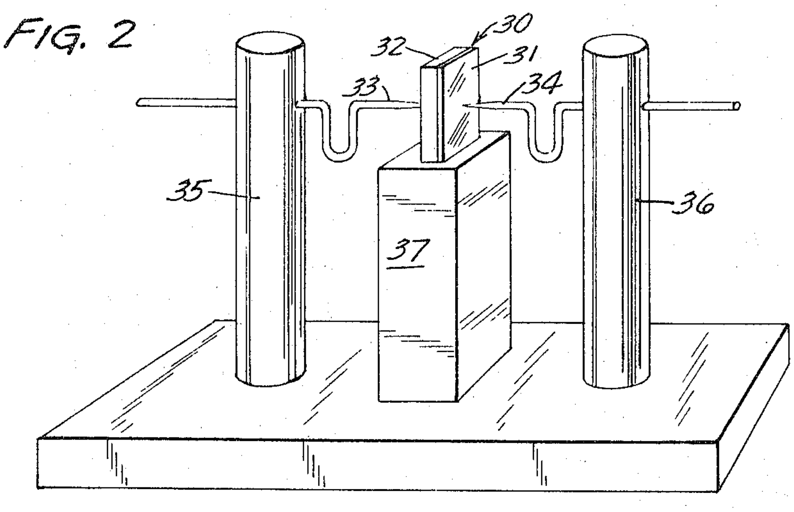
FIGURE 2 shows one embodiment of a semi-conductor switch construction using a glass composition of this invention.

One embodiment of this invention in the form of a switching element mounted for electrical and switching tests is illustrated in FIGURE 2. The switching element or device 30 comprised of, for example, a one mil (or about 0.025 mm.) layer 31 of glass of Example 1, Table I, on an aluminum substrate 32, is positioned on a support 37 between a pointed tungsten electrode 33 which contacts the aluminum backing and a pointed electrode 34 which contacts the glass layer. The tungsten electrodes are conveniently made of 50 mil (or about 1.25 mm.) wires having U-shaped bends as illustrated so as to facilitate spring loading or application of pressure at their points of contact with the switching element. One end of each tungsten electrode is held rigidly by supports 35 and 36, respectively, which serve also as convenient connection points for batteries, pulse generators, measuring meters and other circuit components conventionally used to evaluate the properties of semiconductors.

Figure 3:
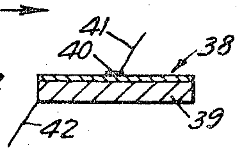
FIGURE 3 is a vertical sectional view taken across the central portion of another embodiment of a semiconductor switch device of the invention.
Figure 4:
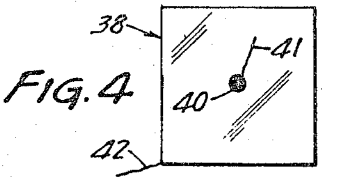
FIGURE 4 is a top plan view of the device of FIGURE 3.

Another embodiment of a device of this invention is shown in FIGURES 3 and 4. In these figures, the switching element comprising a glassy layer 38 on an aluminum substrate 39 has fixed lead wire 41 and 42, respectively. Lead wire 41 is attached to the glass surface by soldering to a spot 40 of air drying silver paste using Woods metal or other low melting solder. Lead wire 42 is conveniently attached to the aluminum substrate by spot welding or other suitable means of joining metals to aluminum.

Figure 5:
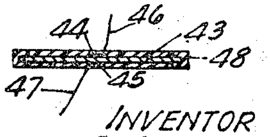
FIGURE 5 is a view similar to FIGURE 3 but showing a modified form of such device.

Still another embodiment of a device of this invention is shown in FIGURE 5 in which a wafer 43 of the semiconducting glass of composition 26, Table III, does not require the support of a metal substrate and because of its relatively low initial resistance can be employed in substantially thicker sizes. Since the initial resistance of this glass is several orders of magnitude lower than that of the previous examples, layers as thick as 20 mils (about 0.5 mm.) can be employed. These thicker wafers can be prepared by conventional semiconductor dicing and lapping techniques. Leads 46 and 47 are attached to the glass wafer 43 of FIGURE 5 by application of air drying silver spots 44 and 45 and soldering with a low melting solder, such as a Woods metal as previously described. The whole assembly, with the exception of the ends of the lead wires, may then be potted in a commonly used insulating plastic resin 48 for protection and ease of handling.

In general, whether point contact or area contact is made between electrodes and a glass wafer (sometimes called glassy layer or the like for convenience), one achieves the characteristic symmetrical switching capabilities associated with a semiconductor device of this invention.

Figure 7:
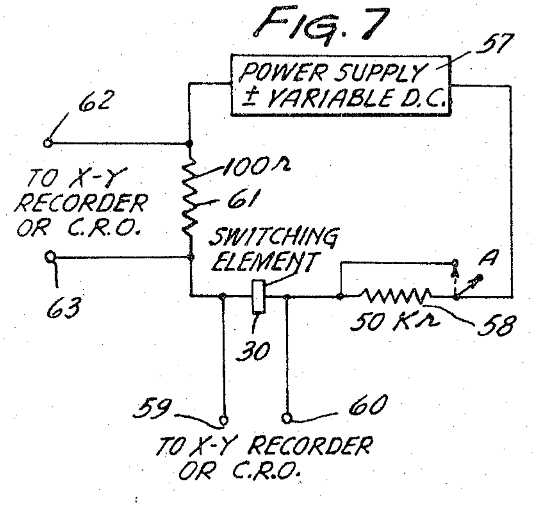
FIGURE 7 shows one embodiment of a circuit diagram suitable for initially activating (i.e. inducing conduction) and then measuring electrical properties of a device of the invention.
Figure 6:
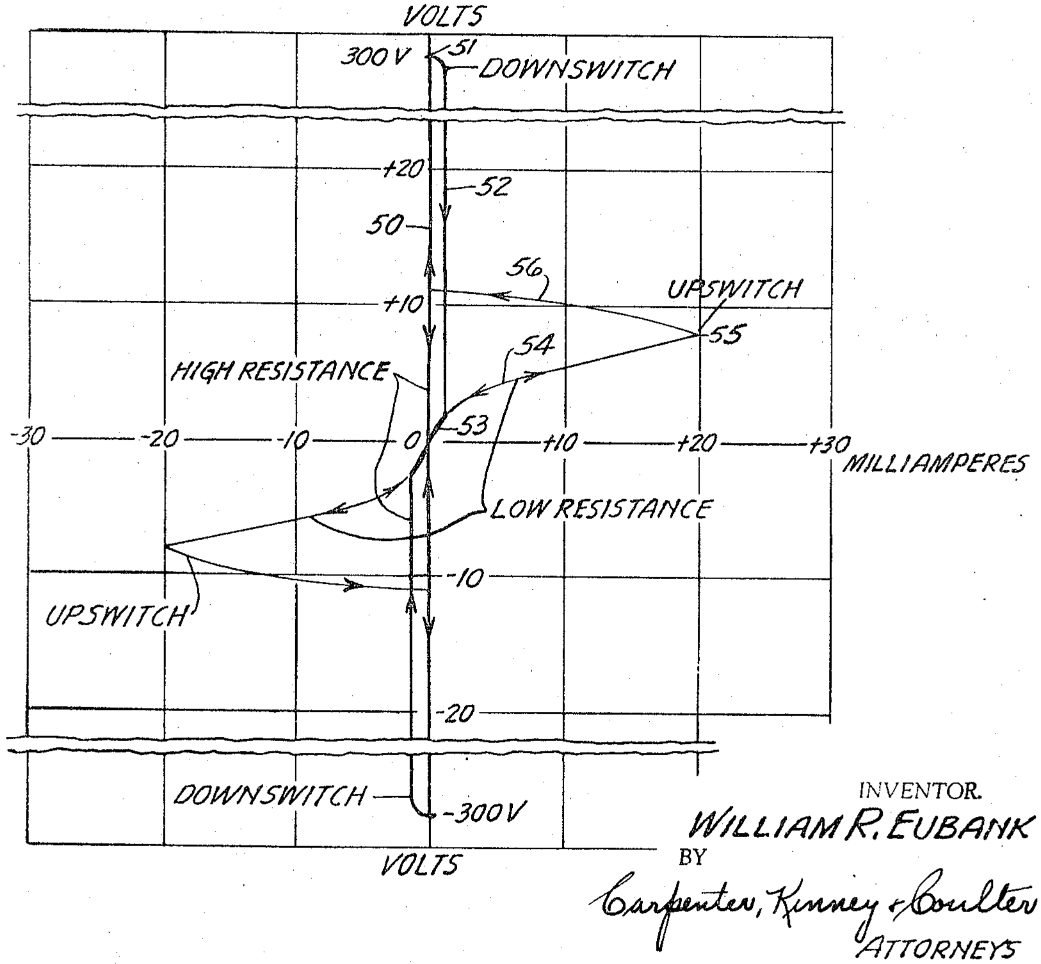
FIGURE 6 is a voltage-current plot showing switching characteristics of semi-conductor switch devices of this invention.

FIGURE 6 shows a typical symmetrical switching curve for a device of the invention. To understand this plot, a series resistance, such as a 50 kiloohm resistor 58, as in FIGURE 7 is placed in the circuit to control current and act as a voltage divider. Assume a device 30 of this invention to be in its high resistance state and that a positive electric field is to be applied thereto. The voltage is gradually increased (see FIG. 6) from the origin or zero with little flow of current along the curve 50. At some critical voltage, say 300 volts at point 51 in the illustration of the figure, the device 30 begins to pass current, as shown by the curve 52, and switches rapidly to its low resistance state at point 53.

Next, voltage is reduced to zero along the low resistance curve 54 and the said series resistance 58 is removed from the circuit. Voltage is again increased positively across device 30 and the low resistance curve 54 results. Voltage-current plot then follows the characteristic low resistance curve 54 to a point 55. The device 30 now again switches to its high resistance state along the negative resistance curve 56 back to high resistance curve 50. This cycle can be repeated indefinitely with either positive or negative voltages. Negative voltages are also illustrated in FIGURE 6. Such use of positive and negative voltages thus produces a symmetrical voltage-current plot.

FIGURE 7 represents one specific embodiment of a circuit useful for switching a device 30 to produce a switching curve such as shown in FIGURE 6. The circuit consists of a 1000-volt, 500-milliampere direct current power supply 57, a 50-kiloohm series resistor 58, a switch A and the device 30. Voltage current characteristics are observed using the pair of terminals 59, 60 and 62, 63 which can be connected, for example, to an *x–y* recorder or a cathode ray oscilloscope. A 100-ohm resistor 61 is used for current sampling (e.g. measuring current flow in the circuit) as by connecting an *x–y* recorder or a cathode ray oscilloscope across terminals 62 and 63. For activation of device 30 from its initial high resistance state, switch A is opened, thereby placing 50-kiloohm resistance 58 in a series with device 30, and a positive or a negative direct current voltage is gradually applied to device 30. When a critical voltage is reached (dependent on composition and construction of device 30) the initial high resistance drops sharply to a stable low resistance state. Thereafter, when switch A is closed (i.e. the 50-kiloohm resistance 58 is removed from the circuit) and the voltage is gradually increased to a critical value, the resistance of device 30 increases suddenly to a high stable resistance state. This high resistance is typically one order of magnitude less than the initial high resistance as indicated above. For downswitching to the low resistance state the procedure is identical to that used for activation except that a lower electric field pulse may be used. Other embodiments of this circuit can be readily constructed.

The glass of Example 1 has an initial resistance when in a 1 mil (about 0.025 mm.) thick vitreous layer of about $5\times10^{12}$ ohms (assuming about 1 mil (about 0.025 mm.) spacing for electrodes). This glass requires a field of 2000 volts per mil (about $8\times10^4$ volts per mm.) to induce conduction. After induced conduction is established, this semiconductor glass has a characteristic low resistance state typically of about 200 ohms for a 1 mil (about 0.025 mm.) thick vitreous layer. Such glass after conduction has thus been induced is capable of downswitching from a characteristic constant high resistance state to a characteristic low resistance state when a voltage pulse of 300 volts is passed therethrough. It is then capable of upswitching from its characteristic low resistance state to its characteristic high resistance state with a voltage pulse of 8 volts.

Another example is the glass of Example 4. Electrical properties of devices of this invention are illustrated by data in tables above. For example, compared to the glass of Example 1, the glass of Example 4 when formed into a device has an initial resistance of about 2 orders of magnitude lower and has a characteristic high resistance of about $8\times10^{10}$ ohms for a 1 mil (about 0.025 mm.) thick layer. After being rendered conductive, it has a low resistance value of about 500 ohms per mil (about $2\times10^4$ ohms per mm.) and is capable of upswitching from this characteristic low resistance state to a characteristic high resistance state of $10^{10}$ ohms per mil (about $4\times10^{11}$ ohms per mm.) when a voltage pulse of only 3 volts is impressed upon it. It is then capable of downswitching from its characteristic low resistance state with a voltage pulse of 190 volts in a highly repeatable manner.

The electrical characteristics of glasses which have compositions within shaded areas A and C of FIGURE 1 differ from the electrical characteristics of glasses of shaded area B. For example, the glass of Example 11, which contains no free metal having a particle size larger than about 1 micron in maximum cross-sectional dimension, has an initial high resistance for a 1 mil (about 0.025 mm.) thick layer of about $10^{12}$ ohms, whereas the glass of Example 4 which falls within area B has an initial high resistance of about two orders of magnitude less or about $10^{10}$ ohms for a 1 mil (about 0.025 mm.) thick layer.

Switching characteristics differ in glasses of this invention. For example, the glass of Example 1 requires 2000 volts per mil (about $8\times10^4$ volts per mm.) to induce conduction versus 700 volts per mil (about $2.8\times10^4$ volts per mm.) for the glass of Example 4. Furthermore, the glass of Example 4 requires lower voltage pulsation for both upswitching and downswitching than does the glass of Example 1.

In the semiconductive glasses of this invention the precise path when conduction is induced is generally not known in an individual device. Hence resistance values instead of resistivity for the various states (initial, high and low resistance, respectively) are used for convenience and are expressed in terms of a 1 mil (about 0.025 mm.) thickness of glass.

The term "wafer" as used in this application has a reference to a mass of a glass composition of this invention and is generic to such other terms as layer, film, etc. in thin, sheet-like configurations; such term also has reference to not only thin disk-like shapes but also to other physical shapes of generally small dimensions.

By the term "symmetrical switching" as used in this application, reference is made to a characteristic transition from high to low resistance states (and vice versa) by means of an applied polarity independent electric field in the form of a pulse or equivalent. This effect is characterized by the fact that a series resistance is required for conversion (i.e. switching) from high to low resistance states.

In addition to their usefulness in switching devices, the glass compositions of this invention have certain other uses.

Thus, when part of the antimony in a ternary glass composition is substituted by arsenic and part of the sulfur by selenium, there results an opaque glass composition characterized by having:

(a) high fluidity at temperatures of from about 600 to 650° C., (b) ability to wet ceramic materials when in a liquid state, and (c) initial high resistivity greater than about $10^{12}$ ohm-centimeters at room temperature.

Specifically, such opaque glass compositions comprise from about 20 to 30 atomic percent antimony, from about 23 to 33 atomic percent sulfur, from about 10 to 20 atomic percent iodine, from about 14 to 18 atomic percent arsenic, and from about 20 to 28 atomic percent selenium (see, for example, Table 5). In the foregoing composition, the total atomic percentage of elements in any given glass composition is always 100.

Glass compositions for manufacturing glass beads of useful retroreflective structures are produced when a portion of the antimony in the ternary glass of area A, FIGURE 1 is replaced by arsenic. These glass compositions are characterized by having:

(a) a refractive index $\eta_D$ of from about 2.7 to 2.85, (b) the capacity to transmit only light in the range from about 6000 to 7000 A. when struck by a source of directional polychromatic visible light.

Specifically, such glass compositions comprise from about 20 to 24 atomic percent arsenic, from about 13 to 17 atomic percent antimony, from about 44 to 52 atomic percent sulfur, and from about 5 to 15 atomic percent iodine, the total atomic percentage of elements in any given glass composition always being 100.

When these glass compositions are formed into glass structures, such as glass beads, fibers, flakes, and thin plates, the resulting structures comprise new and useful article of manufacture. In general, these glass structures have thicknesses not exceeding about 2 millimeters and have high optical dispersion values and high dielectric constants. They are also substantially stable to various types of atmospheric weathering conditions, such as ultra-violet light, humidity, precipitation, etc.

One particularly useful form of glass element comprises glass beads having average individual diameters not exceeding about 100 microns. As those skilled in the art will readily appreciate, the beads can be made by fusing particles of carefully sized cullet which are blown or dropped through a high temperature zone to soften them sufficiently to form transparent spheres by the action of surface tension while moving through a gas such as nitrogen followed by rapid cooling to harden the so-produced spheres without devitrification. The cullet can be made by quenching a stream of molten glass in water. The beads can also be made directly from a batch of molten glass.

Fibers can be made by jet-blowing a stream of molten glass. Filaments can be made by drawing molten glass through a die followed by rapid cooling. Thin plates and flakes can be made by casting a thin layer of molten glass upon a cool steel surface. Small jewelry "gems" can be made from pieces of this glass. The high refractive index and the high optical dispersion results in high surface sparkle and high internal light reflection.

A particularly preferred form for the glass of this invention comprises transparent glass beads having average diameters not exceeding about 100 microns and formed from glass characterized by having a refractive index of at least 2.6, having compositions as above described.

The properties of glass compositions useful in retroreflective structures are illustrated by Table VI below. These glasses are made by the closed tube method above described and then formed into cullet. The cullet is then passed through a hot zone and the resulting red beads are thereafter sized.

The term "cullet" has reference to broken and sized glass, the size range being suitable for the manufacture of glass beads.

TABLE VI.—RED RETROREFLECTIVE GLASSES

| Example No. | Composition (Atomic Percent) | | | | Relative Light Transmission, percent [1] | Retroreflective Color | Refractive Index [2] |
|---|---|---|---|---|---|---|---|
| | Sb | As | S | I | | | |
| 17A | 12 | 27 | 56 | 5 | >50 | Red-orange | 2.73 |
| 17B | 15 | 24 | 56 | 5 | ~50 | Bright red | 2.78 |
| 17C | 15 | 22 | 48 | 15 | ~50 | do | 2.81 |
| 17D | 18 | 19 | 53 | 10 | <50 | Dark red | 2.86 |

[1] For glass beads of 50 microns average diameter.
[2] Refractive index $\eta_D$ measured with petrographic microscope employing apparent depth of focus method.

The embodiments of the invention in which an exclusive property or privilege is claimed as defined as follows:

1. A ternary glass composition comprising antimony, sulfur and iodine in an amount falling within the shaded areas A, B and C of FIGURE 1 in the drawing.

2. A ternary glass composition capable of being formed into a continuous solid phase by cooling from a liquid phase at temperatures above 600° C. to room temperature at a rate slower than about 10° C. per second, said composition comprising antimony, sulfur and iodine in amounts as defined by shaded area A of FIGURE 1 in the drawing.

3. The glass composition of claim 2 characterized by having integrally imbedded therein when a solid state substantially discreet deposits of free antimony metal not greater than about 1 micron in average individual maximum cross-sectional dimension.

4. A ternary glass composition capable of being formed into a continuous solid phase by cooling from a liquid phase at temperatures above 600° C. to room temperature at a rate slower than about 10° C. per second, said composition comprising antimony, sulfur and iodine in amounts as defined by shaded area B of FIGURE 1 in the drawing.

5. A ternary glass composition capable of being formed into a continuous solid phase by cooling from a liquid phase at temperatures above 600° C. to room temperature at a rate faster than about 100° C. per second, said composition comprising antimony, sulfur and iodine in amounts as defined by shaded area C of FIGURE 1 in the drawing.

6. A glass composition comprising:
(a) antimony, sulfur and iodine in respective amounts as defined by the shaded area A of FIGURE 1 of the drawings;
(b) the atomic percent of antimony present being partially replaced by at least one and less than 4 of the elements and in a respective maximum amount selected from the group consisting of indium up to about 15 atomic percent, silicon up to about 10 atomic percent, germanium up to about 20 atomic percent, tin up to about 15 atomic percent, lead up to about 10 atomic percent, phosphorus up to about 8 atomic percent, arsenic up to about 24 atomic percent and bismuth up to about 2 atomic percent, there being always at least 15 atomic percent antimony present;
(c) the atomic percent of sulfur present being partially replaced by at least one of the elements and in respective maximum amount selected from the group consisting of selenium up to about 12 atomic percent and tellurium up to about 12 atomic percent;
(d) the minimum amount of antimony in any given composition not being less than about 15 atomic percent, and
(e) the minimum amount of sulfur in any given composition not beibng less than about 24 atomic percent.

7. An opaque glass composition characterized by having:
(a) high fluidity at temperatures of from about 600 to 650° C.,
(b) ability to wet ceramic materials when in a liquid state, and
(c) resistivity greater than about $10^{12}$ ohm centimeters at room temperature,
said composition comprising:

from about 20 to 30 atomic percent antimony,
from about 23 to 33 atomic percent sulfur,
from about 10 to 20 atomic percent iodine,
from about 14 to 18 atomic percent arsenic, and
from about 20 to 28 atomic percent selenium, the total atomic percentage of elements in any given glass composition always being 100.

8. A glass composition suitable for use in glass beads for retroreflective structures characterized by having:
(a) a refractive index $\eta_D$ of from about 2.7 to 2.85,
(b) the capacity to transmit only light in the range of from about 6,000 to 7,000 A. when struck by a source of directional polychromatic visible light,
said composition comprising:

from about 20 to 24 atomic percent arsenic,
from about 13 to 17 atomic percent antimony,
from about 44 to 52 atomic percent sulfur, and
from about 5 to 15 atomic percent iodine, the total atomic percentage of elements in any given glass composition always being 100.

9. Glass beads characterized by having:
(a) a refractive index $\eta_D$ of from about 2.7 to 2.85,
(b) the capacity to transmit only light in the range of from about 6,000 to 7,000 A. when struck by a source of directional polychromatic light,
(c) average individual diameters not exceeding about 100 microns,
said glass beads comprising:

from about 20 to 24 atomic percent arsenic,
from about 13 to 17 atomic percent antimony,
from about 44 to 52 atomic, percent sulfur, and
from about 5 to 15 atomic percent iodine, the total atomic percentage of elements in any given glass composition always being 100.

10. A solid state switching device which, when semiconductive, is capable of switching from a characteristic high resistance state to a characteristic low resistance state in response to a downswitch electric field pulse and further capable of switching from said low resistance state to said high resistance state in response to an upswitch electric field pulse, said downswitch pulse being larger than said upswitch electric field pulse, said high resistance state being at least about one order in magnitude greater than said low resistance state, said device comprising:
(a) a wafer of a glass composition as defined in claim 1;
(b) two electrodes each one functionally associated with a different surface region of said wafer;
(c) the relationship between said wafer and each of said electrodes, respectively, being such that:
(1) said wafer has a characteristic initial resistance state measured through said electrodes greater than said characteristic high resistance state; and (2) when a sufficient minimum electric field is applied to said wafer through said electrodes, said wafer becomes semiconductive as indicated by a change from said characteristic initial resistance state to said characteristic low resistance state.

11. A solid state switching device which, when semiconductive, is capable of switching from a characteristic high resistance state to a characteristic low resistance state in response to a downswitch electric field pulse and further capable of switching from said low resistance state to said high resistance state in response to an upswitch electric field pulse, said downswitch pulse being larger than said upswitch pulse, said high resistance state being at least about one order in magnitude greater than said low resistance state, said device comprising:

(a) a wafer of a glass composition as defined in claim 6;

(b) two electrodes each one functionally associated with a different surface region of said wafer;

(c) the relationship between said wafer and each of said electrodes, respectively, being such that:

(1) said wafer has a characteristic initial resistance state measured through said electrodes greater than said characteristics high resistance state; and (2) when a sufficient minimum electric field is applied to said wafer through said electrodes, said wafer becomes semiconductive as indicated by a change from said characteristic initial resistance state to said characteristic low resistance state.

12. A solid state semiconductor switching device comprising:

(a) a wafer of a glass composition as defined in claim 1;

(b) said wafer having a front face and a back face;

(c) each such respective face being separated from the other by an average glass thickness of from about 0.5 to 18 mils (about 0.012 to 0.45 mm.);

(d) the numerical value of the surface area of each such face being substantially greater than the numerical value of such glass thickness;

(e) a pair of electrodes each one associated with a different one of said respective faces and adapted to establish electrical contact therewith;

(f) the relationship between said wafer and each of said electrodes, respectively, being such that the initial resistance measured through said electrodes across said wafer is from about $10^5$ to $10^{13}$ ohms per mil (about $4\times10^6$ to $4\times10^{14}$ ohms per mm.) of shortest distance between said electrodes;

(g) when a sufficient minimum electric field is applied through said electrodes across said wafer to produce conductivity between said electrical contacts, the low resistance is from about $10^2$ to $10^3$ ohms per mil (about $4\times10^3$ to $4\times10^4$ ohms per mm.) of shortest distance between said electrodes;

(h) when an electric field of from about 0.8 to 10 volts per mil (about 32 to 400 volts per mm.) is thereafter applied through said electrodes across said wafer, the resistance across said wafer changes to a high value of from about $10^4$ to $10^{12}$ ohms per mil (about $4\times10^5$ to $4\times10^{13}$ ohms per mm.) of shortest distance between said electrodes;

(i) when an electric field of from about 8 to 500 volts per mil (about 320 to $2\times10^4$ volts per mm.) is thereafter applied through said electrodes across said wafer, the resistance across said wafer returns to a low value of from about $10^2$ to $10^3$ ohms per mil (about $4\times10^3$ to $4\times10^4$ ohms per mm.) of shortest distance between said electrodes;

(j) said initial high resistance before conduction has been induced being about one order of magnitude higher than said high resistance;

(k) said low resistance being about one order of magnitude less than said high resistance; and (1) the difference between said initial resistance and said low resistance being about at least two orders of magnitude.

13. A solid state semiconductor switching device comprising:

(a) a wafer of a glass composition as defined in claim 6;

(b) said wafer having a front face and a back face;

(c) each such respective face being separated from the other by an average glass thickness of from about 0.5 to 18 mils (about 0.012 to 0.45 mm.);

(d) the numerical value of the surface area of each such face being substantially greater than the numerical value of such glass thickness;

(e) a pair of electrodes each one associated with a different one of said respective faces and adapted to establish electrical contact therewith;

(f) the relationship between said wafer and each of said electrodes, respectively, being such that the initial resistance measured through said electrodes across said wafer is from about $10^5$ to $10^{13}$ ohms per mil (about $4\times10^6$ to $4\times10^{14}$ ohms per mm.) of shortest distance between said electrodes;

(g) when a sufficient minimum electric field is applied through said electrodes across said wafer to produce conductivity between said electrical contacts, the low resistance is from about $10^2$ to $10^3$ ohms per mil about $4\times10^3$ to $4\times10^4$ ohms per mm.) of shortest distance between said electrodes;

(h) when an electric field of from about 0.8 to 10 volts per mil (about 32 to 400 volts per mm.) is thereafter applied through said electrodes across said wafer, the resistance across said wafer changes to a high value of from about $10^4$ to $10^{12}$ ohms per mil (about $4\times10^5$ to $4\times10^{13}$ ohms per mm.) of shortest distance between said electrodes;

(i) when an electric field of from about 8 to 500 volts per mil (about 32 to $2\times10^4$ volts per mm.) is thereafter applied through said electrodes across said wafer, the resistance across said wafer returns to a low value of from about $10^2$ to $10^3$ ohms per mil (about $4\times10^3$ to $4\times10^4$ ohms per mm.) of shortest distance between said electrodes;

(j) said initial high resistance being about one order of magniutde higher than said high resistance;

(k) said low resistance being about one order of magnitude less than said high resistance; and (l) the difference between said initial resistance and said low resistance being about at least two orders of magnitude.

14. An electrical switching unit comprising:

(a) a solid state switching device as defined in claim 13, (b) a source of variable electric energy, (c) means for controlling the quantity of electric energy from said source between limits at least sufficient to switch said device from one resistance state to another, (d) a resistor in series with said device and adapted to limit the quantity of electric energy from said source applied to said device to a level sufficient to prevent breakdown of said device when said device is passing from its characteristic high to its characteristic low resistance state, and (e) conductor means functionally interconnecting said device, said source, said controlling means, and said resistor.

15. A method for controlling which one of two quantities of electric energy shall pass a given point in an electric conductor, there being inserted at such point in said conductor a solid state switching device as defined in claim 13 above, said method comprising the steps of:

(a) applying to said switching device a predetermined low energy electric field sufficient to switch said switching element from a characteristic low resistance state to a characteristic high resistance state when said device is initially in such characteristic low resistance state, and (b) applying to said switching device a predetermined high energy electric field sufficient to switch said switching device from such characteristic high resistance state to such characteristic low resistance state when said element is initially in its high resistance state, there being connected in series with said device a resistance before said high energy electric field is so applied sufficient to prevent breakdown of said device by said high energy electric field when said device switches from such characteristic high resistance state to such characteristic low resistance state.

References Cited by the Examiner

UNITED STATES PATENTS

| | | | |
|---|---|---|---|
| 3,024,119 | 3/1962 | Flaschen et al. | 106—47 |
| 3,117,013 | 1/1964 | Northover et al. | 106—47 |
| 3,177,082 | 4/1965 | MacAvoy | 106—47 |
| 3,241,009 | 3/1966 | Dewald et al. | 106—47 |
| 3,249,469 | 5/1966 | Stegherr | 252—514 |
| 3,258,434 | 6/1966 | Mackenzie et al. | 106—47 |

RICHARD M. WOOD, *Primary Examiner.*

W. D. BROOKS, *Assistant Examiner.*

UNITED STATES PATENT OFFICE

CERTIFICATE OF CORRECTION

Patent No. 3,312,923 April 4, 1967

William R. Eubank

It is hereby certified that error appears in the above numbered patent requiring correction and that the said Letters Patent should read as corrected below.

Column 1, lines 31 and 32, strike out " and to methods for making such devices"; columns 3 and 4, in TABLE I, fifth column, line 9 thereof, for "$3.3\times10^{12}$" read -- $3.3\times10^{13}$ --; column 9, line 26, strike out "Group VIB of the periodic table as more specifically in-"; column 10, line 66, after "about" insert -- $4\times10^{3}$ to --; column 11, line 25, for "One" read -- Once --; column 15, line 16, for "as", first occurrence, read -- are --; column 18, line 5, "(l)" should be in the margin under (k) so as to indicate that it is not a subparagraph of (k); same column 18, line 32, before "about" insert -- ( --.

Signed and sealed this 21st day of November 1967.

(SEAL)
Attest:

EDWARD M.FLETCHER,JR.
Attesting Officer

EDWARD J. BRENNER
Commissioner of Patent